(12) United States Patent
Aldama

(10) Patent No.: US 6,742,420 B2
(45) Date of Patent: Jun. 1, 2004

(54) THIN WALL FASTENER (76) Inventor: Ernest M. Aldama, 5319 Burnside Ct., Fremont, CA (US) 94538

( * ) Notice: Subject to any disclaimer, the term of this patent is extended or adjusted under 35 U.S.C. 154(b) by 0 days.

(21) Appl. No.: 10/081,754

(22) Filed: Feb. 21, 2002

(65) Prior Publication Data

US 2002/0141844 A1 Oct. 3, 2002

Related U.S. Application Data (60) Provisional application No. 60/270,545, filed on Feb. 21, 2001.

(51) Int. Cl.⁷ ............................................... B25B 13/48
(52) U.S. Cl. ..................................................... 81/125.1
(58) Field of Search ...................... 81/125.1; 411/34–38, 411/43, 54, 55, 70

(56) References Cited

U.S. PATENT DOCUMENTS

| | | | | |
|---|---|---|---|---|
| 4,630,510 A | * | 12/1986 | Belanger | 81/55 |
| 4,631,889 A | * | 12/1986 | Adam et al. | 52/565 |
| 4,647,086 A | * | 3/1987 | Maxwell et al. | 285/342 |
| 4,681,494 A | * | 7/1987 | Pratt et al. | 411/54 |
| 4,747,204 A | * | 5/1988 | Pratt et al. | 29/523 |
| 4,772,167 A | * | 9/1988 | Beals | 411/43 |
| 5,205,688 A | | 4/1993 | Sundstrom | 411/38 |
| 5,259,713 A | | 11/1993 | Renner et al. | 411/34 |
| 5,259,714 A | | 11/1993 | Campbell | 411/34 |
| 5,308,204 A | | 5/1994 | Moen | 411/37 |
| 5,350,264 A | * | 9/1994 | Stencel | 411/55 |
| 5,403,135 A | | 4/1995 | Renner et al. | 411/34 |
| 6,183,179 B1 | | 2/2001 | Gaquere | 411/43 |
| 6,254,324 B1 | | 7/2001 | Smith et al. | 411/34 |
| 6,454,502 B1 | * | 9/2002 | Cosenza et al. | 411/43 |

* cited by examiner

*Primary Examiner*—Lee D. Wilson
*Assistant Examiner*—David B. Thomas
(74) *Attorney, Agent, or Firm*—Gregory Smith & Associates (57) ABSTRACT

A fastener for mounting objects to a wall or to a floor. The fastener includes an anchor member having an elongate body with a shank portion having a spacer formed integrally with one end, a central longitudinal hole extending through the elongate body, and an internally thread section in the longitudinal hole near a second end of the shank. The shank further includes a deformable expansion region between the first end and the second end of the shank. The fastener further includes a mandrel configured to be received within the longitudinal hole of the elongate body.

21 Claims, 6 Drawing Sheets

THIN WALL FASTENER

CROSS-REFERENCE TO OTHER APPLICATIONS

This application claims the benefit of U.S. Provisional Application No. 60/270,545, filed Feb. 21, 2001.

FIELD OF INVENTION

The present invention relates to thin wall fasteners usable for a variety of purposes. More specifically, the present invention relates to a plug type thin wall fastener assembly utilizing a mandrel and an anchor member. The present invention is particularly suited for seismic restraint purposes and for fastening system applications used in steel stud construction.

BACKGROUND OF THE INVENTION

Mounting an object to a thin wall or floor surface with a hollow space behind the wall or floor (hereafter referred to together as "wall") is challenging. This is because one can not manually access the space behind the wall, and because the wall itself may not provide sufficient structure to resist the moment of a typical bolt or screw inserted therein once a load is applied to the bolt or screw.

Some prior art fasteners have attempted to overcome part of this problem by providing a means for expanding a portion of the fastener on the opposite side of the wall to prevent the fastener from pulling out of the hole in the wall into which the fastener has been inserted. Generally the wall is squeezed between a front portion of the fastener and the expanded portion of the fastener. Examples include nut and bolt arrangements, bolt and nut/washer combinations, toggle bolts, and deformable plug fasteners.

A toggle bolt is a bolt having a spring loaded expandable structure coupled to one end. The expandable structure can be collapsed so that the toggle bolt passes though a hole drilled into a wall. Once the expandable structure has passed through the hole in the wall, the expandable structure springs open. One disadvantage to such fasteners is that removing the bolt allows the expandable portion to fall to the bottom of the hollow space behind the wall. Furthermore, the expandable portion may not provide sufficient resistance to turning of the entire assembly as the bolt is tightened.

A deformable plug assembly is another type of thin wall fastener. Generally such devices comprise a plug formed as an elongate body having a central longitudinal hole, a top end, a deformable middle section and a threaded portion at the end opposite the top end. When the deformable plug assembly is placed in a hole in the wall, the screw is turned and the threaded portion moves toward the top end. The deformable portion expands to a configuration that is larger than the hole to provide clamping pressure on the back side of the wall. Such devices may include features to enhance rotational resistance to prevent the deformable plug from rotating along with the bolt. However, large fasteners, and fasteners for use with very heavy objects, may require large torquing forces to be applied to set the fasteners, and the large torquing forces required may overcome the rotational resistance features of the prior art, and in addition may crack brittle wall materials.

In a typical steel stud building, the steel studs will have some wall material placed over the steel studs to form the surface of the wall. A typical floor type used in multistory office buildings consists of concrete laid over sheets of corrugated steel. Prior art fasteners used on such concrete floors may crack the concrete when tightened. Also, the concrete may crack during seismic activity.

A typical wall material includes dry wall comprising a gypsum material sandwiched between two layers of paper. Prior art fasteners will squeeze the wall material when set, which can crack or crush the wall material, resulting in poorly set fasteners. Furthermore, seismic activity also tends to crack brittle materials such as dry wall and concrete.

What is needed is a thin wall fastener, a thin wall fastener assembly, and a method of using such thin wall fasteners that overcomes disadvantages of the prior art, that can withstand severe torquing, and that allows a bolt to be removed and replaced for affixing objects to the wall.

SUMMARY OF THE INVENTION

One embodiment of the invention is a thin wall fastener or anchoring apparatus for mounting objects to a thin wall or floor surface (hereafter "wall"). The anchoring apparatus is comprised of a spacer member having means for rotation encompassing an aperture, integral with an open ended cylindrically shaped shank member, integral with an open ended cylindrically shaped clinching member having means for expanding upon being compressed, integral with an open ended cylindrically shaped threaded member having internal threads. The members of the anchoring apparatus share a common central axis.

In other embodiments, the anchoring apparatus further comprises a mandrel having a head at one end with means suitable for rotation, and a cylindrical shaft extending from the head, the cylindrical shaft having an externally threaded distal end for engaging the internal threads of the anchoring apparatus. Together, the anchoring apparatus and mandrel combine to form a thin wall fastener assembly.

Additionally, the thin wall fastener assembly may further include a spanner wrench having means for preventing rotation of the anchoring apparatus, while also enabling rotation of the mandrel.

DETAILED DESCRIPTION OF THE INVENTION

The following description is provided to enable any person skilled in the art to make and use the invention and sets forth the best mode presently contemplated by the inventor of carrying out the invention. Various modifications, however, will remain readily apparent to those skilled in the art, as generic principles of the present invention have been defined herein.

One embodiment of the present invention is a thin wall fastener, and a thin wall fastener assembly, which may be used for a variety of purposes, but particularly for seismic restraint systems in steel stud construction.

In a typical building, the walls consist of steel studs that will have some wall material placed over the steel studs to form the surface of the wall. A typical wall material includes dry wall comprising a gypsum material sandwiched between two layers of paper. The present invention preferably allows the formation of relatively small holes in the wall material in order to access the steel studs and install the fastener of the present invention.

The fastener of the present invention does not make contact with the brittle material portions of a wall. Instead, the fastener of the present invention makes contact only with the steel portions of the wall. The other more brittle portions of the wall are removed. The purpose is to create a better fastener, one that does not rely upon brittle wall material for adhesion, instead the fastener only contacts the metal portions of a wall.

Thin wall fasteners of the present invention are preferably configured so that, when installed, the top surface of the fastener will extend a selected distance from the surface of the steel stud. The purpose is to create a flush surface between the wall and the thin wall fastener. Generally, it is preferred that the selected distance will approximately equal the thickness of the wall material that covers the steel studs, so that the fastener of the invention presents a surface approximately flush with the plane of the wall. However, in some situations it may be preferred that the top of the thin wall fastener of the invention deviate from the plane of the wall.

In one embodiment, the thin wall fastener of the invention comprises a mandrel and an anchor member. An important characteristic of the fastener is that the anchor member is constructed to expand in snug engagement with the surface surrounding a hole drilled into the steel stud. Also, the fastener is configured to accept a threaded bolt. A second important characteristic of the anchor member is the integral spacer. As previously explained, the height of the spacer may vary, and will typically be selected to accommodate a known thickness of a wall or floor material covering the steel stud.

In other embodiments the invention further includes a spanner wrench. The spanner wrench engages the spacer to prevent the anchor member from turning during the setting process, without interfering with access to the mandrel.

Figure 1A:
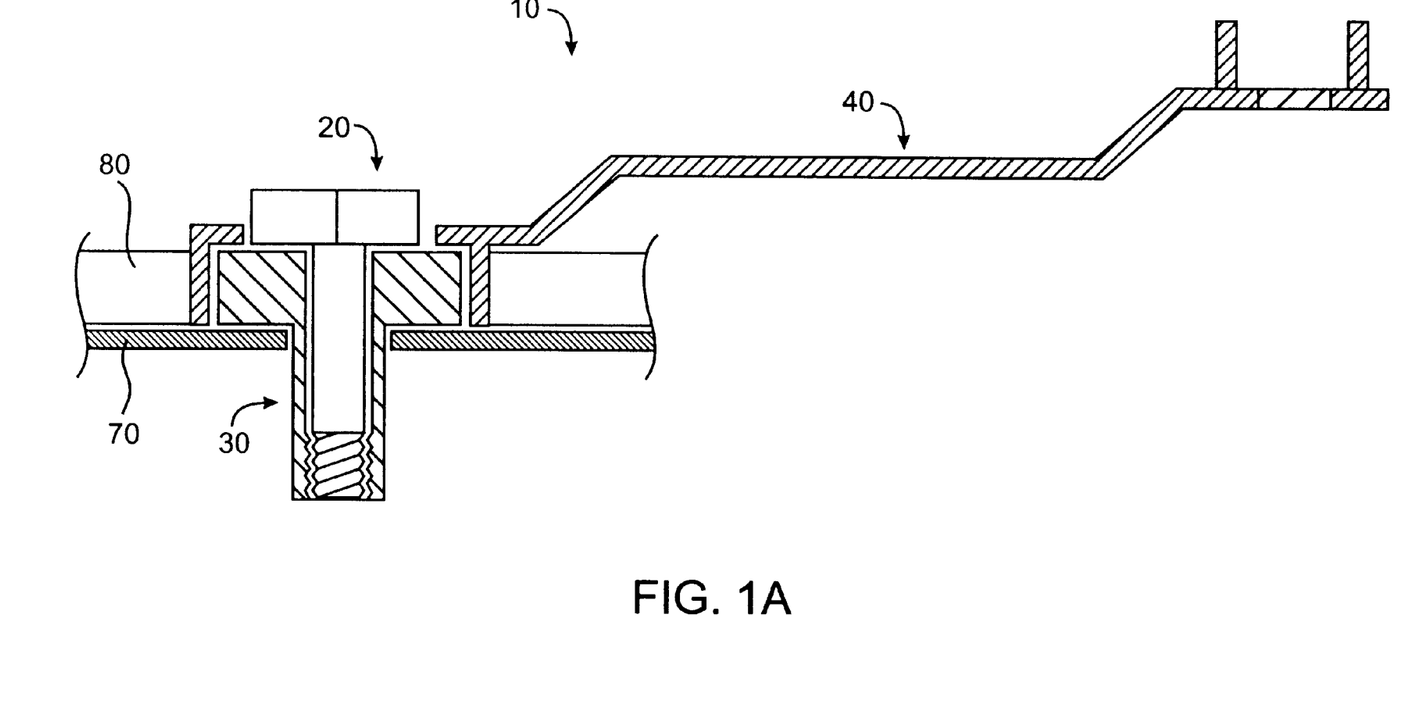
FIG. 1A shows in section an embodiment of the thin wall fastener assembly inserted into a wall and steel stud with the anchor member in an unset state.
Figure 1B:
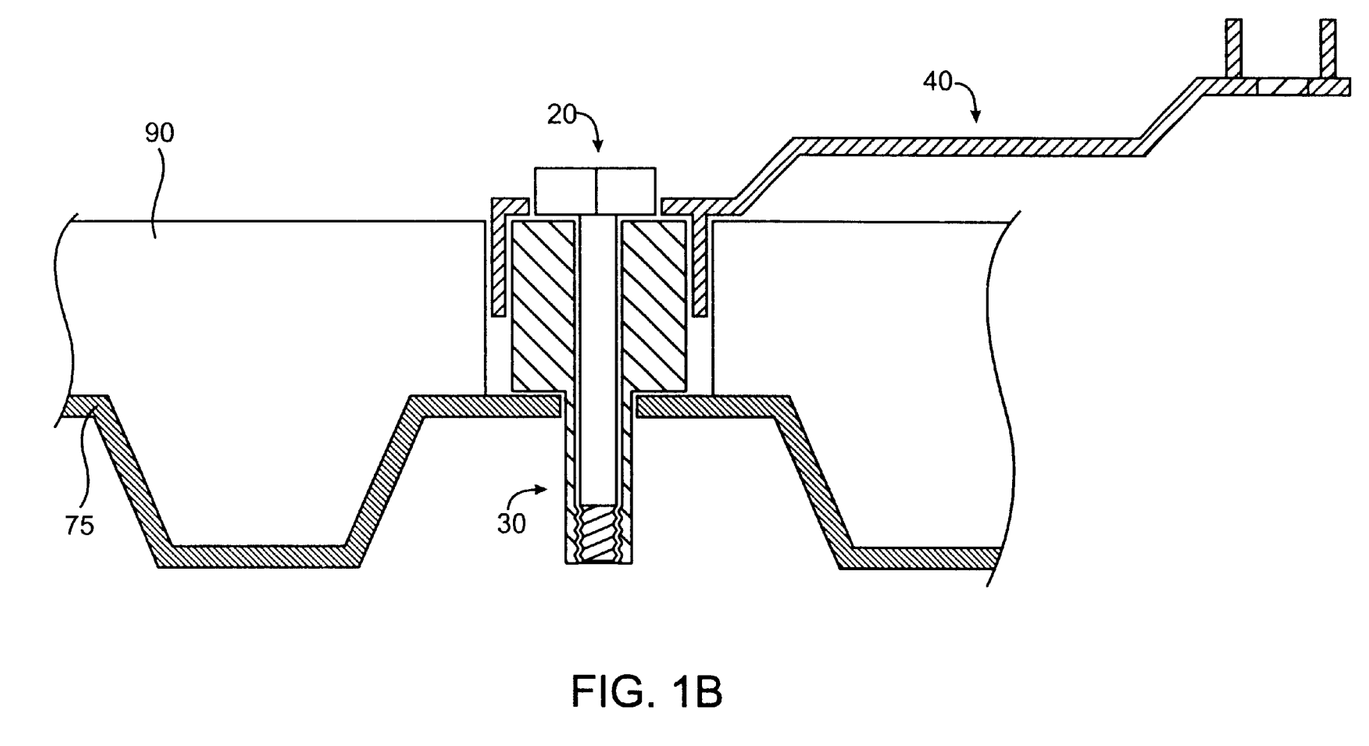
FIG. 1B shows in section another embodiment of the thin wall fastener assembly inserted into a concrete floor and corrugated steel stud with the anchor member in an unset state.

Reference will now be made in detail to a presently preferred embodiment of the invention as illustrated in the accompanying drawings. FIG. 1A shows a fastener particularly suited for use in seismic restraint systems in steel stud wall construction. FIG. 1B shows another embodiment of the thin wall fastener for use in floors comprised of corrugated steel studs overlaid with concrete or other flooring materials.

In a preferred embodiment of the invention seen in FIG. 1A, the fastener assembly 10 comprises a mandrel 20 cooperatively received in an anchor member 30, and may also include a spanner wrench 40 for engaging the anchor member 30. FIG. 1A also illustrates the relative position of the steel stud 70 and existing wall 80 in relation to the thin wall fastener assembly 10.

FIG. 1B illustrates the preferred relative position of the corrugated steel stud 75 and overlaid concrete floor 90 in relation to the thin wall fastener assembly 10.

Figure 2:
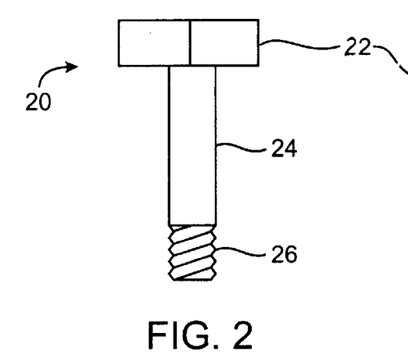
FIG. 2 shows in side view an embodiment of the mandrel.

Referring to FIG. 2, the mandrel 20 preferably comprises a bolt-like structure capable of setting the anchor member 30 by rotational force. In order to provide sufficient rotational force to set the anchor member 30, the mandrel 20 preferably comprises a shear resistant material, such as steel, although a variety of materials acceptable for such use are well known.

Figure 3:
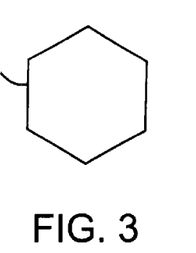
FIG. 3 shows a top view of an embodiment of the mandrel.

As shown in FIGS. 2 and 3, the mandrel 20 preferably includes a hexagonal head 22 at one end, and a shaft 24 extending from the hexagonal head 22. The hexagonal head 22 is preferably sized to accommodate any standard or metric sized wrench. In alternative embodiments, the head may be any practical shape that can be rotated by a tool such as a wrench, screwdriver, or the like. Preferably, the distal end of the shaft 26 includes an externally threaded section to be cooperatively received by an internally threaded section of the anchor member 30. Any commercially available thread size may be used.

Figure 4:
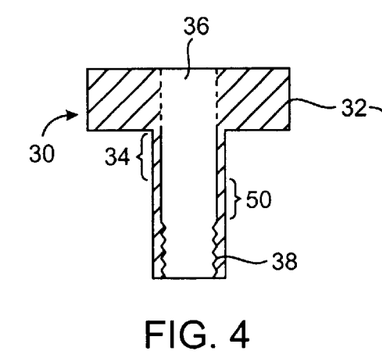
FIG. 4 shows in section a side view of an embodiment of the anchor member in an unset state.

Referring to FIG. 4, the anchor member 30 preferably comprises a structure capable of providing seismic restraint when set into a steel stud. To provide the necessary seismic restraint, the anchor member 30 is preferably fabricated from steel or other materials resistant to shearing due to seismic events.

Figure 5:
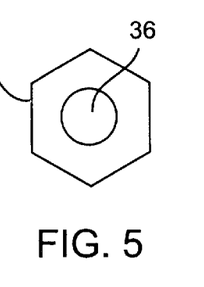
FIG. 5 shows a top view of an embodiment of the anchor member.

In a preferred embodiment the anchor member 30 includes a spacer 32 at one end and a shank 34 extending from the spacer 32. The spacer 32 shown in the preferred embodiment is hexagonal in shape, however, any practical shape of the spacer 32 may be used. Thus, for example, the spacer 32 may be square in shape. The shank 34 shown in the preferred embodiment is cylindrical in shape, although, any practical shape of the shank 34 may be used. The spacer 32 and shank 34 preferably have a bore 36 along their central axis, best seen in FIGS. 4 and 5. The bore 36 in spacer 32 and shank 34 is preferably sized to accommodate the mandrel shaft 24. It is preferred that the spacer 32 extend above the shank 34 a selected distance, typically sufficient to approximately equal the thickness of any existing wall material 80. However, many other dimensions of the spacer 32 could be used.

The anchor member shank 34 preferably includes an internally threaded section 38 at a predetermined distance within the shank 34. The threaded section 38 is preferably configured for threadably receiving the externally threaded distal end of the shank 26 of the mandrel 20. The threaded section 38 is preferably at least four thread lengths and capable of receiving at least one additional component once the mandrel 20 is removed. Any variety of components may be secured to the wall, such as braces, shelving, straps or other fasteners to secure various objects to the wall 80. Although four thread lengths is preferred, any practical number of thread lengths that provide adequate thread contact with the mandrel 20 or the additional component may be used. Any practical thread size may be used, however, small thread sizes may provide insufficient seismic restraint.

Figure 7:
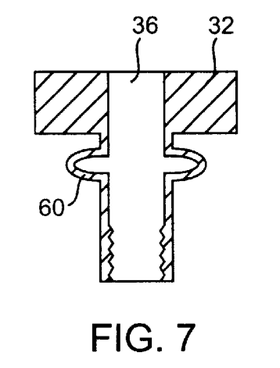
FIG. 7 shows in section a side view of an embodiment of the anchor member in a set state.

The anchor member shank 34 further comprises a clinching section 50, positioned between the spacer 32 and the internally threaded section 38. The clinching section 50 is intended to preferentially deform to set the fastener. The clinching section 50 is preferably a pre-weakened section that collapses when force is applied by the rotation of the mandrel 20. The clinching section 50 collapses to form an enlargement 60, as seen in FIG. 7, thus "setting" the thin wall fastener assembly 10.

In prototype construction, the clinching section 50 was pre-weakened, by forming the walls of the clinching section somewhat thinner than adjacent sections of the shank. However, any known means for causing the shank to expand preferentially at the clinching section 50 may be used. For example, alternative embodiments of the clinching section 50 may comprise a plurality of parallel slots cut through the shank 34 arranged parallel relative to one another and to the central axis of the shank 34.

Figure 8:
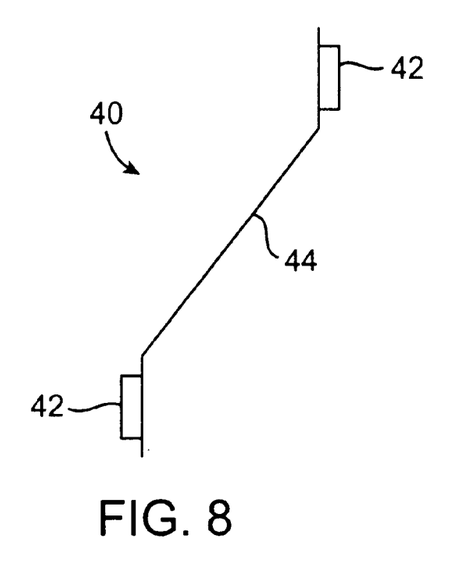
FIG. 8 shows a side view of an embodiment of the spanner wrench.
Figure 9:
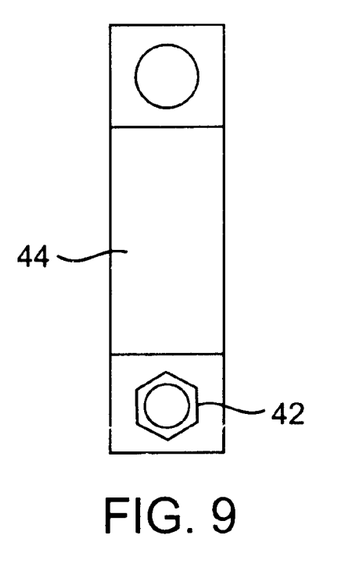
FIG. 9 shows a top view of an embodiment of the spanner wrench.

In some embodiments, a spanner wrench 40 is an included component of the thin wall fastener assembly 10. Referring to FIGS. 1A and 1B, a spanner wrench 40 engages the spacer 32 to hold the anchor member 30 during the setting process. The engaging section 42 of the spanner wrench 40 preferably extends vertically away from the planar surface of the wrench and is sized and shaped to engage the spacer 32. The engaging section 42 includes an aperture sized to allow the mandrel head to rotate without hindrance from contacting the spanner wrench 40. In a preferred embodiment, as seen in FIGS. 8 and 9, the handle 44 of the spanner wrench 40 is angled to allow the user to hold the wrench above the working surface when using the thin wall fastener assembly on large planar surfaces. In the preferred embodiment shown in FIGS. 8, 9, and 10 the engaging section 42 is hexagonal in shape. It is preferable that the engaging section 42 extend from the outer surface of the existing wall to the base of the spacer 32. However, any practical length of engaging section 42 may be used. It is preferable that engaging section 42 firmly engage the outer surface of the spacer 32. In some embodiments, each end of the spanner wrench 40 may have a different sized engaging section 42. However, any practical shape and engaging configuration of the spanner wrench 40 and engaging section 42 may be used.

Figure 6A:
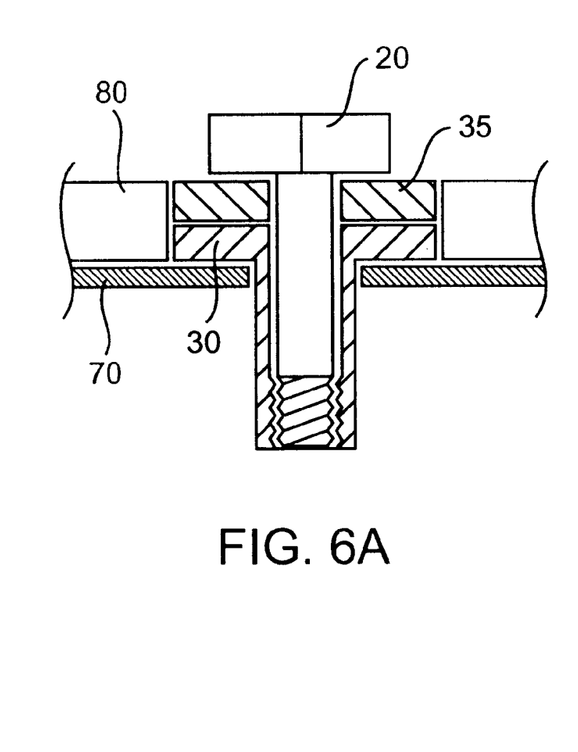
FIG. 6A shows in section another embodiment of an anchor member inserted into a wall and steel stud with a sleeve to approximate the thickness of the existing wall.
Figure 6B:
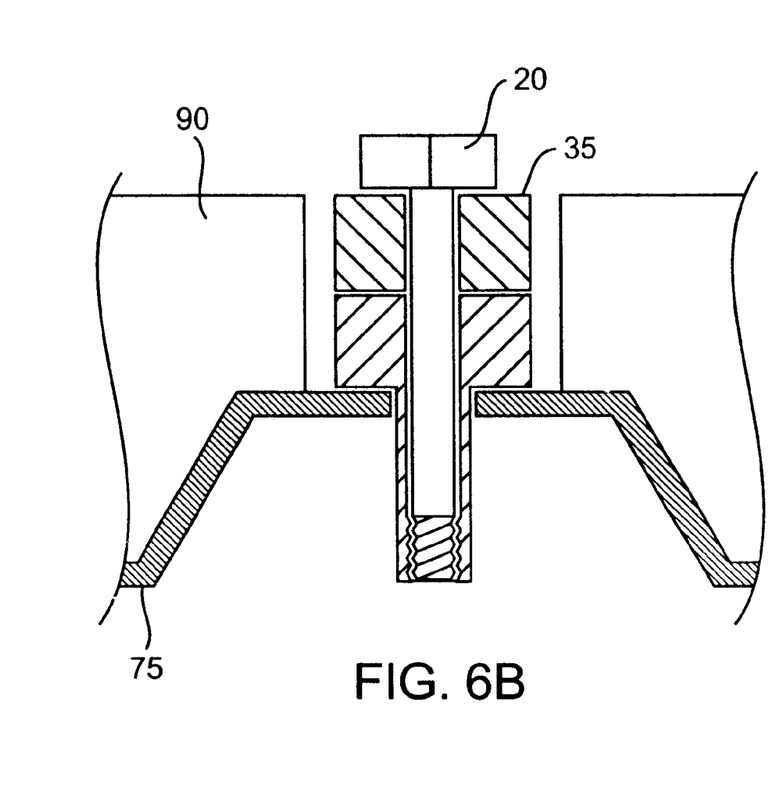
FIG. 6B shows in section another preferred embodiment of the anchor member inserted into a concrete floor and corrugated steel stud with a sleeve to approximate the thickness of the existing floor.

In another preferred embodiment as shown in FIG. 6A, a sleeve 35 may be used in conjunction with the spacer 32 to approximate the thickness of the existing wall 80. In another preferred embodiment as shown in FIG. 6B, a sleeve 35 may be used in conjunction with the spacer 32 to approximate the thickness of the existing concrete floor 90.

Figure 10A:
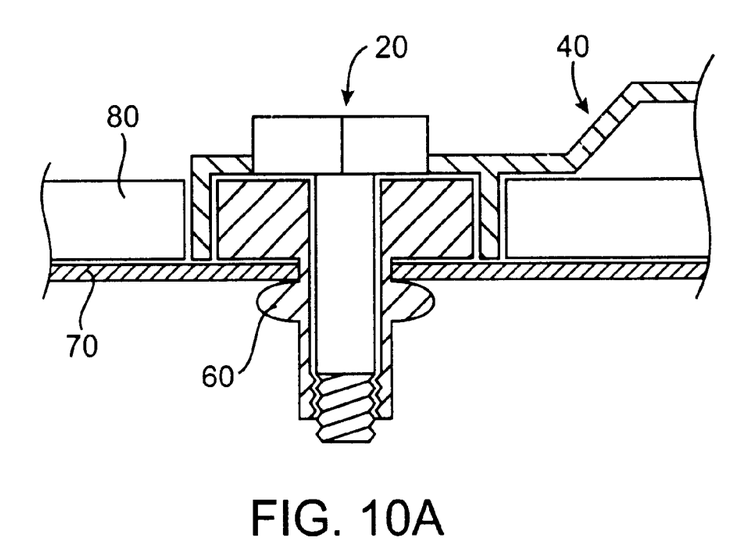
FIG. 10A shows in section an embodiment of the thin wall fastener assembly inserted into a wall and steel stud with the anchor member in a set state.
Figure 10B:
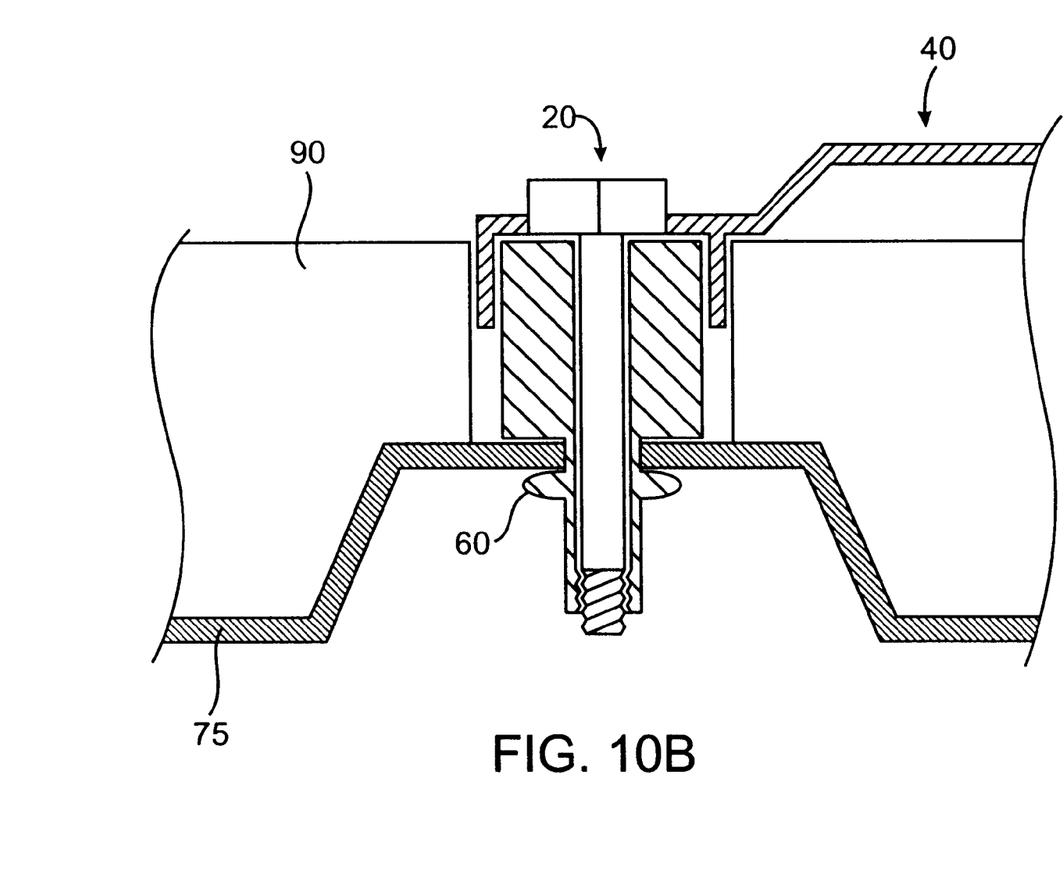
FIG. 10B shows in section another preferred embodiment of the thin wall fastener assembly inserted into a concrete floor and corrugated steel stud with the anchor member in a set state.

In use on a steel stud thin wall, the fastener 10 of the invention is installed by using a metal detector or stud sensor to locate the steel stud. An appropriately sized hole is drilled through the existing wall 80 and into the steel stud 70. This first hole should be large enough for the shank 34 of the anchor member 30 to pass through, but not large enough to allow the spacer 32 of the anchor member 30 to pass through. A second larger diameter hole is then drilled in the wall material. The diameter of the second hole is preferably larger than the diameter of the spacer 32, so that the spanner wrench 40 can be used to hold the anchor member 30 in place while the mandrel 20 is being rotated, as explained below. In alternate methods, the order in which the holes are drilled can be reversed, or the differing diameter sections can be drilled simultaneously. The anchor member 30 is placed into the appropriately sized hole drilled into the steel stud 70, such that the top surface of the spacer 32 is flush with the existing wall 80. If the top surface of the spacer 32 is not flush with the existing wall 80, a sleeve 35 may be used to approximate the thickness of the existing wall 80, if desired. The spanner wrench 40 is then engaged over the spacer 32 to hold the anchor member 30 in place. Rotational force is then applied to the mandrel head 22 by a wrench, socket, screwdriver, etc., causing the mandrel 20 to threadably engage the anchor member 30. As clockwise rotational pressure is applied to the mandrel head 22, the mandrel 20 causes a pulling force onto the anchor member 30. The pulling force on the anchor member 30 causes the clinching portion 50 to expand as it is compressed, forming an enlargement 60 against the backside of the steel stud 70. This is best seen in FIG. 10A and in FIG. 10B. The enlargement 60 holds the anchor member 30 in firm contact with the steel stud 70 or corrugated steel stud 75 and inhibits movement of the anchor member. The mandrel 20 is then removed from the anchor member 30 by unscrewing in a counter-clockwise rotation. The spanner wrench 40 is then disengaged from the spacer 32. The threaded portion 38 is resistant to rotation because the enlargement 60 holds the anchor member 30 in firm contact with the wall or floor.

The invention is capable of securing at least one additional component to the wall 80 or concrete floor 90. Any variety of components may be used, such as braces, shelving, straps or other fasteners. The internally threaded portion 38 now acts like a fixed nut. Thus, the mandrel 20 may be used again, along with a washer if desired, for firmly attaching any component to the floor or wall.

What is claimed is:

1. In combination:
   a surface having a surface thickness formed of a first thickness and a second thickness, said first thickness being formed of a structural member;
   a fastener formed of an anchor member comprising an elongate body having a shank portion with a first end and a second end, a spacer formed integrally with said first end, a central longitudinal hole extending through said elongate body, and an internally threaded section in said longitudinal hole near said second end, said shank including a deformable expansion region between said first end and said second end of said shank,
   a hole extending through said surface and having a first diameter and a second diameter, said hole being of said first diameter through said first thickness and being of said second diameter through said second thickness, said first diameter being larger than said threaded section of said shank and smaller than said spacer, said second diameter being larger than said spacer; and
   a mandrel configured to be received within said longitudinal hole, said mandrel comprising a head, a shaft, and a threaded portion on said shaft.

2. The fastener of claim 1, further comprising a spanner wrench having means for preventing rotation of the anchor member while also enabling rotation of the mandrel.

3. The fastener of claim 1, further including a sleeve member located around said shank portion.

4. The fastener of claim 1, wherein said shank comprises a section that preferentially deforms when compressive pressure is applied by rotating said mandrel.

5. A method for using the fastener of claim 1, for anchoring an object to a surface having a first layer and a second support layer, the steps comprising:
   (a) providing the fastener as recited in claim 1;
   (b) creating said hole through said surface as recited in claim 1;
   (c) placing said anchor member into the hole;
   (d) engaging said spacer to prevent said anchor member from rotating; and
   (e) applying rotational force to said mandrel causing said deformable expansion region of said anchor member to expand.

6. The method of claim 5, wherein step (d) comprises the step of using a spanner wrench to engage said spacer to prevent said anchor member from rotating.

7. The method of claim 5, further comprising the step of (f) removing the mandrel, disengaging the spanner wrench, and securing an object to the surface by threading a bolt like structure into the anchor member.

8. The method of claim 7, wherein said bolt like structure is said mandrel.

9. The combination of claim 1, further comprising a spanner wrench having an engaging section with a perimeter sized and configured to fit within said hole in said second thickness of said surface and an interior sized and configured to engage said spacer.

10. A fastener assembly comprising in combination:
    an anchor member comprising an elongate body having a shank portion with a first end and a second end, a spacer formed integrally with said first end, a central longitudinal hole extending through said elongate body, and an internally thread section in said longitudinal hole near said second end, said shank including a deformable expansion region between said first end and said second end of said shank,
    a mandrel configured to be received within said longitudinal hole, said mandrel comprising a head, a shaft, and a threaded portion on said shaft, and
    a spanner wrench having an engaging section of said spanner wrench with a perimeter sized and configured to fit within a hole into which said spacer is located.

11. The fastener of claim 10, further comprising a sleeve member located around said shank portion.

12. The fastener of claim 10, wherein said shank comprises a section that preferentially deforms when compressive pressure is applied by rotating said mandrel.

13. A method for using the fastener of claim 10 for anchoring an object to a surface comprising a first layer and a second support layer, the steps comprising:
    (a) providing an anchor member as recited in claim 10;
    (b) creating a hole in the surface, the hole having a first diameter through said second support layer, and a second diameter larger than said first diameter formed in said first layer;
    (c) placing said anchor member into the hole;
    (d) engaging said spacer to prevent said anchor member from rotating; and
    (e) applying rotational force to said mandrel causing said deformable expansion region of said anchor member to expand.

14. The method of claim 13, wherein step (d) comprises the step of using the spanner wrench to engage said spacer to prevent said anchor member from rotating.

15. The method of claim 13, further comprising the step of (f) removing the mandrel, disengaging the spanner wrench, and securing an object to said surface by threading a bolt like structure into the anchor member.

16. The method of claim 15, wherein said bolt like structure is said mandrel.

17. The fastener of claim 10, wherein said spanner wrench has means for preventing rotation of the anchor member, while also enabling rotation of the mandrel.

18. A method for anchoring an object to a surface comprising a first layer and a second support layer, the steps comprising:
    (a) providing a fastener comprising an anchor member comprising an elongate body having a shank portion with a first end and a second end, a spacer formed integrally with said first end, a central longitudinal hole extending through said elongate body, and an internally thread section in said longitudinal hole near said second end, said shank including a deformable expansion region between said first end and said second end of said shank, and
    a mandrel configured to be received within said longitudinal hole, said mandrel comprising a head, and shaft, and a threaded portion on said shaft;
    (b) creating a hole in the surface, the hole having a first diameter through said second support layer, and a second diameter larger than said first diameter formed in said first layer;
    (c) placing said anchor member into the hole;
    (d) using a spanner wrench placed within the hole and around said spacer to engage said spacer to prevent said anchor member from rotating; and
    (e) applying rotational force to said mandrel causing said deformable expansion region of said anchor member to expand.

19. The method of claim 18, further comprising the step of removing the mandrel, disengaging the spanner wrench, and securing an object to said surface by threading a bolt like structure into the anchor member.

20. The method of claim 19, wherein the bolt like structure is said mandrel.

21. A method for anchoring an object to a surface comprising a first layer and a second support layer, the steps comprising:
    (a) providing a fastener comprising an anchor member comprising an elongate body having a shank portion with a first end and a second end, a spacer formed integrally with said first end, a central longitudinal hole extending through said elongate body, and an internally thread section in said longitudinal hole near said second end, said shank including a deformable expansion region between said first end and said second end of said shank, and
    a mandrel configured to be received within said longitudinal hole, said mandrel comprising a head, and shaft, and a threaded portion on said shaft;
    (b) creating a hole in the surface, the hole having a first diameter through said second support layer, and a second diameter larger than said first diameter formed in said first layer, wherein said second diameter is larger than said spacer, thereby leaving a gap around a perimeter of said spacer when said spacer is located within said hole;
    (c) placing said anchor member into the hole;
    (d) engaging said spacer to prevent said anchor member from rotating; and
    (e) applying rotational force to said mandrel causing said deformable expansion region of said anchor member to expand.

* * * * *